(12) United States Patent
Liu et al.

(10) Patent No.: US 10,857,889 B2
(45) Date of Patent: Dec. 8, 2020

(54) HIGHLY-INTEGRATED FAIL OPERATIONAL E-POWERTRAIN FOR AUTONOMOUS DRIVING APPLICATION

(71) Applicant: NIO USA, Inc., San Jose, CA (US)

(72) Inventors: Xiaodong Liu, San Jose, CA (US); Bo Guo, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 420 days.

(21) Appl. No.: 15/725,119

(22) Filed: Oct. 4, 2017

(65) Prior Publication Data

US 2019/0100105 A1 Apr. 4, 2019

(51) Int. Cl.
*B60L 3/00* (2019.01)
*B60L 15/20* (2006.01)
(Continued)

(52) U.S. Cl.
CPC ............ *B60L 3/0084* (2013.01); *B60L 3/003* (2013.01); *B60L 3/0046* (2013.01);
(Continued)

(58) Field of Classification Search
CPC ........ B60L 53/12; B60L 3/003; B60L 3/0046; B60L 3/0061; B60L 3/0092; B60L 15/20; B60L 2220/46; B60L 2260/28; B60L 53/00; B60L 58/00; B60L 58/10; B60L 3/0076; B60L 3/0084; B60L 15/2009;
(Continued)

(56) References Cited

U.S. PATENT DOCUMENTS 5,244,259 A * 9/1993 Pickenhahn .......... B60T 8/1706
303/137
6,583,603 B1 6/2003 Baldwin
(Continued)

FOREIGN PATENT DOCUMENTS

| CN | 205381159 U | 7/2016 | |
|---|---|---|---|
| WO | WO 2011/011088 | 1/2011 | |
| WO | WO-2017173420 A1 * | 10/2017 | ............... B60K 1/02 |

OTHER PUBLICATIONS

U.S. Appl. No. 15/395,745, filed Dec. 30, 2016, Newman.
(Continued)

*Primary Examiner* — Anthony R Jimenez
(74) *Attorney, Agent, or Firm* — Sheridan Ross P.C.

(57) ABSTRACT

Embodiments of the present disclosure are directed to using Automotive Safety Integrity Level (ASIL) decomposition and a functional deployment strategy to redundantly distribute functionality across existing controllers. Accordingly, each of a plurality of non-redundant controllers of the vehicle can execute a plurality of functions. The controllers can comprise a vehicle controller and a controller for each of a plurality of different powertrain systems. The plurality of functions can comprise one or more functions for each of the plurality of powertrain systems and each of the functions can execute on multiple controllers. When a failure of one controller occurs, this can be detected either by a controller's build-in internal monitor or by a two-way comparison or three-way voting by external controllers. The functions executing on the failed controller can be transitioned to other controllers based on prior execution of those functions by the other controllers.

20 Claims, 9 Drawing Sheets

(51) Int. Cl.
*B60L 58/10* (2019.01)
*B60L 53/12* (2019.01)

(52) U.S. Cl.
CPC ........... *B60L 3/0061* (2013.01); *B60L 3/0092* (2013.01); *B60L 15/20* (2013.01); *B60L 53/12* (2019.02); *B60L 58/10* (2019.02); *B60L 2220/46* (2013.01); *B60L 2260/28* (2013.01)

(58) Field of Classification Search
CPC ............. B60L 15/2018; B60L 15/2027; B60L 15/2036; B60L 15/2054; B60W 50/02; B60W 2050/029; B60W 2050/0292; B60W 2050/023; B60W 20/50; B60W 50/022; B60W 50/0205; G06F 11/181; G06F 11/18; G06F 11/182; G06F 11/183; G06F 11/184; G06F 11/2023; G06F 11/2025; G06F 11/2028; G06F 11/203; G06F 11/2035; G05D 1/00; G05D 1/0077
USPC ......................................................... 701/22
See application file for complete search history.

(56) References Cited

U.S. PATENT DOCUMENTS

| | | | |
|---|---|---|---|
| 8,527,139 | B1 | 9/2013 | Yousuf |
| 8,944,865 | B1 | 2/2015 | Krabacher et al. |
| 9,547,307 | B1 | 1/2017 | Cullinane et al. |
| 9,802,638 | B1 | 10/2017 | Stoffel et al. |
| 9,897,642 | B1 | 2/2018 | Johnson |
| 2008/0234897 | A1 | 9/2008 | Tsuchida |
| 2009/0212634 | A1 | 8/2009 | Kojima et al. |
| 2010/0117585 | A1 | 5/2010 | Fitch et al. |
| 2011/0043152 | A1 | 2/2011 | Kidokoro et al. |
| 2012/0056478 | A1 | 3/2012 | Omoto et al. |
| 2012/0316729 | A1 | 12/2012 | Kim |
| 2012/0330501 | A1* | 12/2012 | Sundaram .......... G05B 23/0248 701/33.9 |
| 2013/0105264 | A1 | 5/2013 | Ruth et al. |
| 2013/0268798 | A1* | 10/2013 | Schade ............... G06F 11/1487 714/3 |
| 2014/0091619 | A1 | 4/2014 | Yoshimi |
| 2014/0139150 | A1 | 5/2014 | Morisaki |
| 2014/0375116 | A1 | 12/2014 | Deneszczuk et al. |
| 2015/0054470 | A1 | 2/2015 | Peuchant et al. |
| 2015/0229080 | A1 | 8/2015 | Degen |
| 2015/0288169 | A1 | 10/2015 | Schinzel et al. |
| 2015/0338849 | A1 | 11/2015 | Nemec et al. |
| 2016/0026205 | A1 | 1/2016 | Song et al. |
| 2016/0096438 | A1 | 4/2016 | Grimes et al. |
| 2016/0229298 | A1 | 8/2016 | Chen et al. |
| 2017/0057510 | A1 | 3/2017 | Herbach et al. |
| 2018/0138816 | A1 | 5/2018 | Katrak |
| 2018/0208064 | A1 | 7/2018 | Wortberg et al. |
| 2018/0294641 | A1 | 10/2018 | Strouse et al. |
| 2019/0039457 | A1 | 2/2019 | Katrak |
| 2019/0337403 | A1 | 11/2019 | Tanaka |

OTHER PUBLICATIONS

U.S. Appl. No. 15/797,506, filed Oct. 30, 2017, Smith et al.
U.S. Appl. No. 15/705,555, filed Sep. 15, 2017, Liu et al.
Favaro et al., Experience with ISO 26262 ASIL Decomposition, Automotive SPIN, 2011, retrieved from http://www.automotive-spin.it/uploads/8/8W_favaro.pdf, 27 pages.
Blackburn, Case Study of an ASIL D Torque Vectored Electric Power Train Aligned to ISO 26262, Zytek Automotive, 2013, retrieved from http://aesin.org.uk/wp-content/uploads/2013/07/ZYTEK-AESIN-Presentation-24th_Sept_13-DB.pdf, 22 pages.
Official Action for U.S. Appl. No. 15/395,745, dated Dec. 19, 2018 7 pages.
Final Action for U.S. Appl. No. 15/705,555, dated Oct. 24, 2019 15 pages.
Official Action for U.S. Appl. No. 15/705,555, dated Feb. 19, 2020 12 pages.
Official Action for U.S. Appl. No. 15/395,745, dated Sep. 28, 2018 6 pages, Restriction Requirement.
Notice of Allowance for U.S. Appl. No. 15/395,745, dated Jun. 26, 2019 7 pages.
Official Action for U.S. Appl. No. 15/705,555, dated Apr. 12, 2019 6 pages, Restriction Requirement.
Official Action for U.S. Appl. No. 15/705,555, dated Jun. 26, 2019 10 pages.
Notice of Allowance for U.S. Appl. No. 15/797,506, dated Nov. 29, 2018 8 pages.
Notice of Allowance for U.S. Appl. No. 15/705,555, dated Jun. 4, 2020, 10 pages.
Corrected Notice of Allowance for U.S. Appl. No. 15/705,555, dated Jul. 27, 2020, 2 pages.

* cited by examiner

HIGHLY-INTEGRATED FAIL OPERATIONAL E-POWERTRAIN FOR AUTONOMOUS DRIVING APPLICATION

FIELD

The present disclosure is generally directed to vehicle systems, in particular, toward systems and methods for providing a fail operational powertrain of a vehicle.

BACKGROUND

Automotive Safety Integrity Level (ASIL) is a risk classification scheme defined by the International Organization for Standardization (ISO) 26262—Functional Safety for Road Vehicles standard. This is an adaptation of the Safety Integrity Level used in International Electrotechnical Commission (IEC) 61508 for the automotive industry. This classification helps define the safety requirements necessary to be in line with the ISO 26262 standard. The ASIL standard is established by performing a risk analysis of a potential hazard by looking at the Severity, Exposure and Controllability of the vehicle operating scenario. The safety goal for that hazard in turn carries the ASIL requirements.

There are four ASILs identified by the standard: ASIL A through ASIL D, and a QM level. ASIL D represents the highest degree of automotive hazard and thus, the highest degree of rigor to be applied to the assure safety requirements are met while ASIL A represents the lowest degree of hazard. The intervening levels between ASIL D and ASIL A are a range of intermediate degrees of hazard and degrees of assurance required. QM represents applications with no automotive hazards and, therefore, no safety requirements to manage under the ISO 26262 safety processes. Any product able to comply with ASIL D requirements would also comply with any lower level.

More specifically, ASIL D represents likely potential for severe, life-threatening, or fatal injury in the event of a malfunction and requires the highest level of assurance that the dependent safety goals are sufficient and have been achieved. Many autonomous and semi-autonomous driving applications such as the powertrain are required to be fail operation with the highest ASIL level. This can be achieved with system redundancies. For example, prior approaches to providing fail operational systems in vehicles have used a primary system with ASIL D components and a back-up system. In some cases, the backup system may use lower ASIL level components. However, having a redundant system, even with lower ASIL level components, still significantly increases the cost of the systems. Redundant components also significantly increase the weight which can also negatively impact the efficiency or range of the vehicle. Hence, there is a need in the art for improved methods and systems for providing fail operational systems, such as powertrains, without the extensive use of redundant hardware components.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
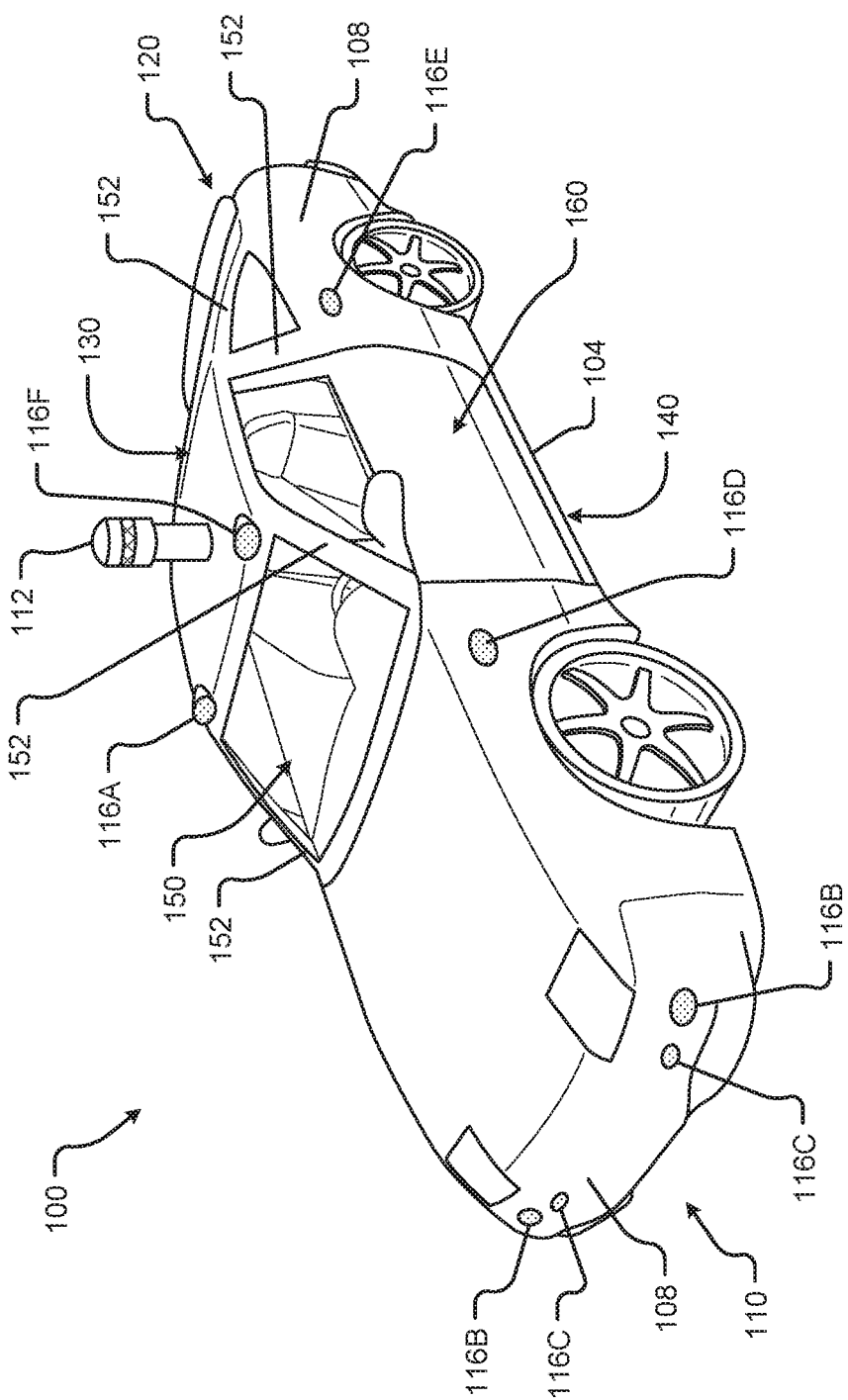
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
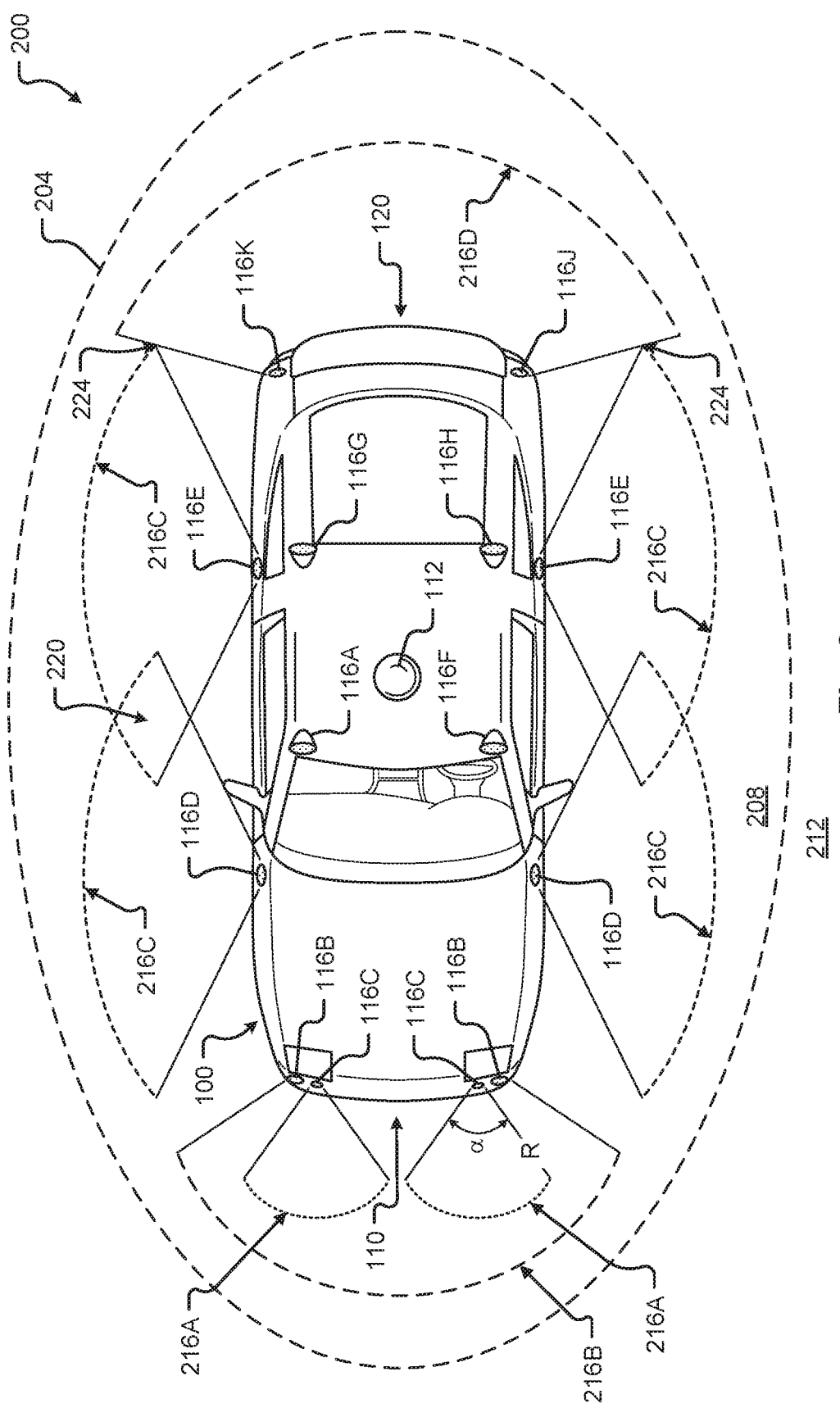
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3:
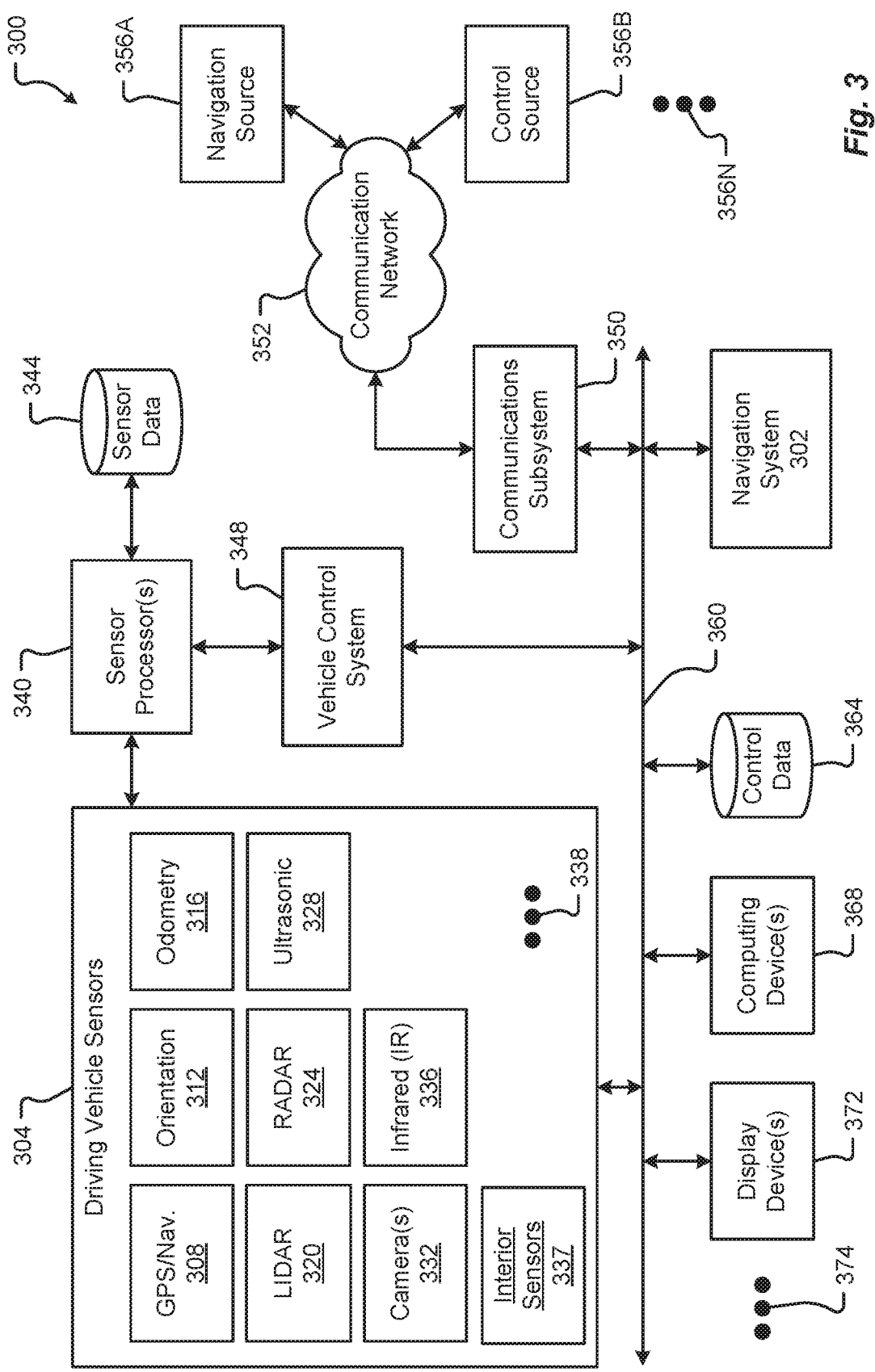
FIG. 3 is a block diagram of an embodiment of a communication environment of the vehicle in accordance with embodiments of the present disclosure.

FIG. 3 is a block diagram of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 337. Interior sensors 337 can measure characteristics of the inside environment of the vehicle 100. A navigation system 302 can include any hardware and/or software used to navigate the vehicle either manually or autonomously.

In some embodiments, the driving vehicle sensors and systems 304 may include other sensors 338 and/or combinations of the sensors 306-337 described above. Additionally or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random-access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random-access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
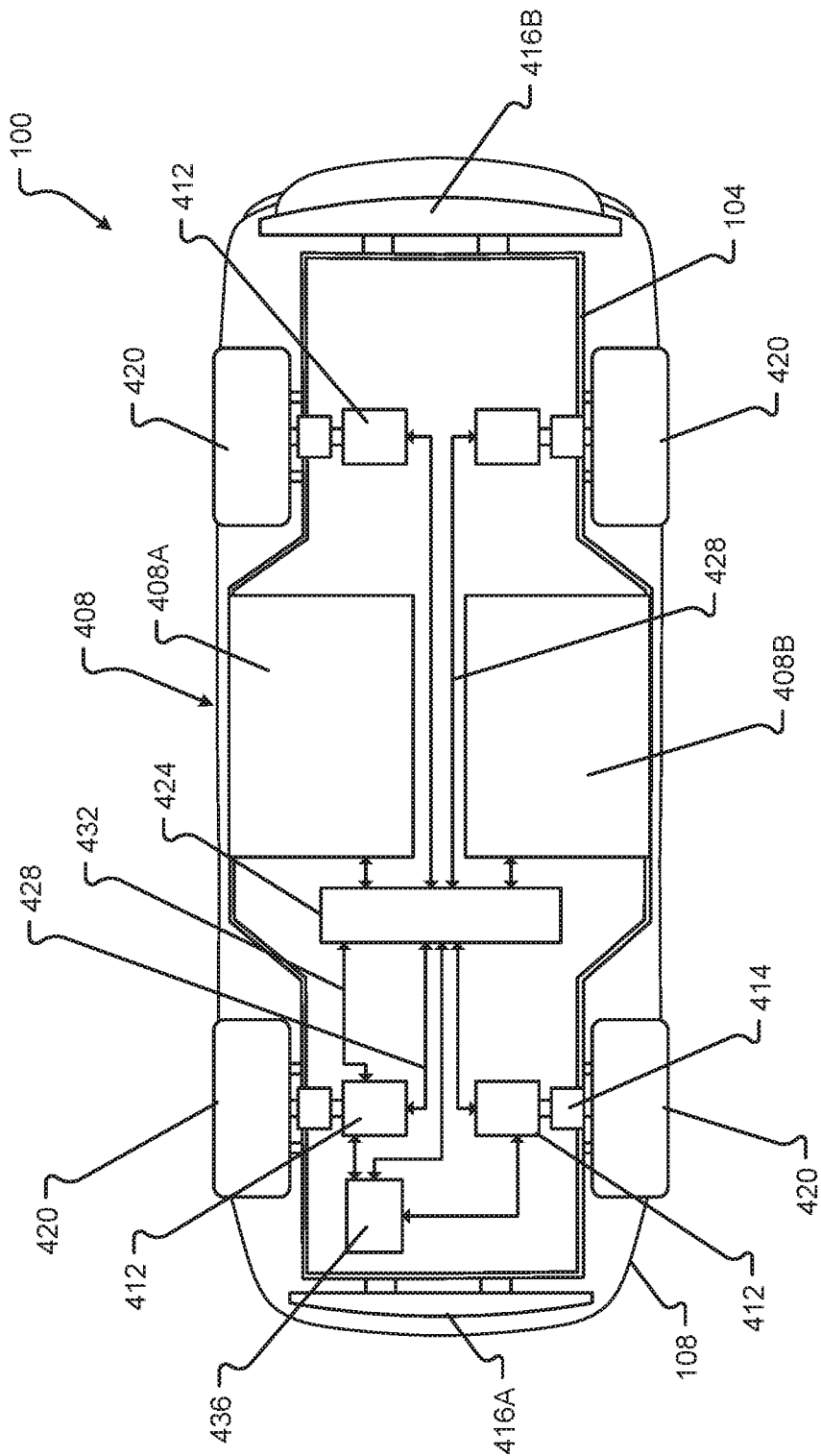
FIG. 4 shows a plan view of the vehicle in accordance with at least some embodiments of the present disclosure.

Referring now to FIG. 4, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to, steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 408A, 408B, motors 412, engines, safety equipment, controllers, user interfaces, interiors exterior components, body panels 108, bumpers 416, sensors, etc., and/or combinations thereof. Additionally, or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 408A, 408B (e.g., battery unit, capacitor unit, etc.) from the vehicle 100 and replace the used power source 408A, 408B with a charged or new power source. Continuing this example, the power source 408A, 408B may include selectively interchangeable features that interconnect with the frame 104 or other portion of the vehicle 100. For instance, in a power source 408A, 408B replacement, the quick release features may be configured to release the power source 408A, 408B from an engaged position and slide or move in a direction away from the frame 104 of a vehicle 100. Once removed, or separated from, the vehicle, the power source 408A, 408B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

In some embodiments, the frame 104 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 104 and/or body of the vehicle 100. In some cases, the features may be built into the frame 104 and/or body of the vehicle 100. In any event, the features may deploy from an unexposed position to an exposed position or may be configured to selectively engage/disengage without requiring an exposure or deployment of the mechanism from the frame 104 and/or body of the vehicle 100. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 412 of the vehicle 100. The electric motors 412 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 420 that are driven by the one or more electric motors 412 and motor controllers 414. In some cases, the vehicle 100 may include an electric motor 412 configured to provide a driving force for each drive wheel 420. In other cases, a single electric motor 412 may be configured to share an output force between two or more drive wheels 420 via one or more power transmission components. It is an aspect of the present disclosure that the powertrain may include one or more power transmission components, motor controllers 414, and/or power controllers that can provide a controlled output of power to one or more of the drive wheels 420 of the vehicle 100. The power transmission components, power controllers, or motor controllers 414 may be controlled by at least one other vehicle controller or computer system as described herein.

As provided above, the powertrain of the vehicle 100 may include one or more power sources 408A, 408B. These one or more power sources 408A, 408B may be configured to provide drive power, system and/or subsystem power, accessory power, etc. While described herein as a single power source 408 for sake of clarity, embodiments of the present disclosure are not so limited. For example, it should be appreciated that independent, different, or separate power sources 408A, 408B may provide power to various systems of the vehicle 100. For instance, a drive power source may be configured to provide the power for the one or more electric motors 412 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 408A, 408B in this manner may provide a number of benefits over conventional vehicle systems. For example, separating the power sources 408A, 408B allow one power source 408 to be removed and/or replaced independently without requiring that power be removed from all systems and/or subsystems of the vehicle 100 during a power source 408 removal/replacement. For instance, one or more of the accessories, communications, safety equipment, and/or backup power systems, etc., may be maintained even when a particular power source 408A, 408B is depleted, removed, or becomes otherwise inoperable.

In some embodiments, the drive power source may be separated into two or more cells, units, sources, and/or systems. By way of example, a vehicle 100 may include a first drive power source 408A and a second drive power source 408B. The first drive power source 408A may be operated independently from or in conjunction with the second drive power source 408B and vice versa. Continuing this example, the first drive power source 408A may be removed from a vehicle while a second drive power source 408B can be maintained in the vehicle 100 to provide drive power. This approach allows the vehicle 100 to significantly reduce weight (e.g., of the first drive power source 408A, etc.) and improve power consumption, even if only for a temporary period of time. In some cases, a vehicle 100 running low on power may automatically determine that pulling over to a rest area, emergency lane, and removing, or "dropping off," at least one power source 408A, 408B may reduce enough weight of the vehicle 100 to allow the vehicle 100 to navigate to the closest power source replacement and/or charging area. In some embodiments, the removed, or "dropped off," power source 408A may be collected by a collection service, vehicle mechanic, tow truck, or even another vehicle or individual.

The power source 408 may include a GPS or other geographical location system that may be configured to emit a location signal to one or more receiving entities. For instance, the signal may be broadcast or targeted to a specific receiving party. Additionally or alternatively, the power source 408 may include a unique identifier that may be used to associate the power source 408 with a particular vehicle 100 or vehicle user. This unique identifier may allow an efficient recovery of the power source 408 dropped off. In some embodiments, the unique identifier may provide information for the particular vehicle 100 or vehicle user to be billed or charged with a cost of recovery for the power source 408.

The power source 408 may include a charge controller 424 that may be configured to determine charge levels of the power source 408, control a rate at which charge is drawn from the power source 408, control a rate at which charge is added to the power source 408, and/or monitor a health of the power source 408 (e.g., one or more cells, portions, etc.). In some embodiments, the charge controller 424 or the power source 408 may include a communication interface. The communication interface can allow the charge controller 424 to report a state of the power source 408 to one or more other controllers of the vehicle 100 or even communicate with a communication device separate and/or apart from the vehicle 100. Additionally, or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 408 to one or more electric motors 412 in the vehicle 100. The power distribution system may include electrical interconnections 428 in the form of cables, wires, traces, wireless power transmission systems, etc., and/or combinations thereof. It is an aspect of the present disclosure that the vehicle 100 include one or more redundant electrical interconnections 432 of the power distribution system. The redundant electrical interconnections 432 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 432 is being used and/or damage has occurred to a particular area of the vehicle electrical system. In any event, the one or more redundant electrical interconnections 432 may be configured along completely different routes than the electrical interconnections 428 and/or include different modes of failure than the electrical interconnections 428 to, among other things, prevent a total interruption power distribution in the event of a failure.

In some embodiments, the power distribution system may include an energy recovery system 436. This energy recovery system 436, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 436, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 408. For example, the recovered electrical energy may be used to charge the power source 408 of the vehicle 100.

The vehicle 100 may include one or more safety systems. Vehicle safety systems can include a variety of mechanical and/or electrical components including, but in no way limited to, low impact or energy-absorbing bumpers 416A, 416B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 5:
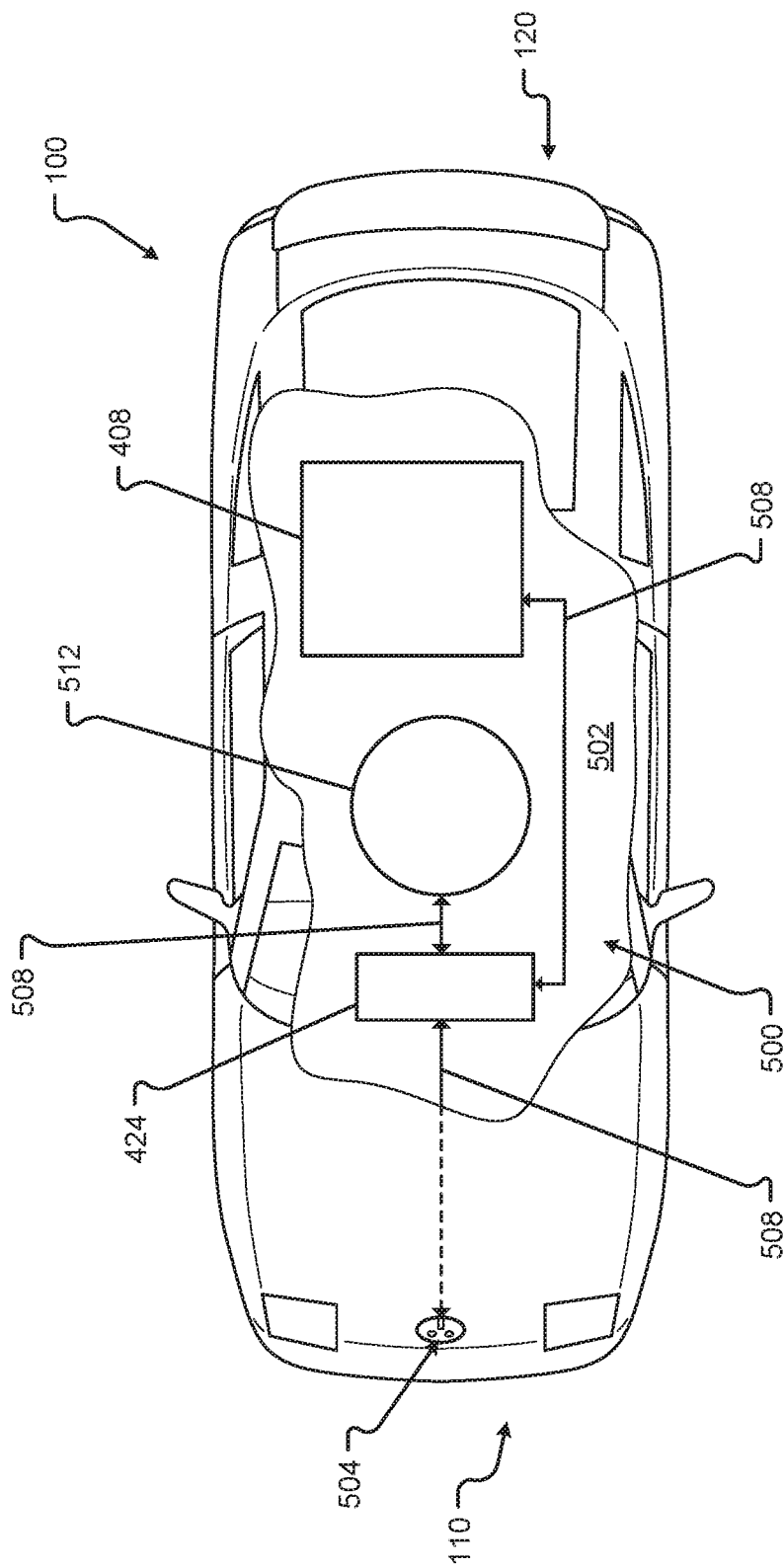
FIG. 5 shows a plan view of the vehicle in accordance with embodiments of the present disclosure.

FIG. 5 shows a plan view of the vehicle 100 in accordance with embodiments of the present disclosure. In particular, FIG. 5 shows a broken section 502 of a charging system 500 for the vehicle 100. The charging system 500 may include a plug or receptacle 504 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 504 may be transferred via at least one power transmission interconnection 508. Similar, if not identical, to the electrical interconnections 428 described above, the at least one power transmission interconnection 508 may be one or more cables, wires, traces, wireless power transmission systems, etc., and/or combinations thereof. Electrical energy in the form of charge can be transferred from the external power source to the charge controller 424. As provided above, the charge controller 424 may regulate the addition of charge to at least one power source 408 of the vehicle 100 (e.g., until the at least one power source 408 is full or at a capacity, etc.).

In some embodiments, the vehicle 100 may include an inductive charging system and inductive charger 512. The inductive charger 512 may be configured to receive electrical energy from an inductive power source external to the vehicle 100. In one embodiment, when the vehicle 100 and/or the inductive charger 512 is positioned over an inductive power source external to the vehicle 100, electrical energy can be transferred from the inductive power source to the vehicle 100. For example, the inductive charger 512 may receive the charge and transfer the charge via at least one power transmission interconnection 508 to the charge controller 524 and/or the power source 408 of the vehicle 100. The inductive charger 512 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 512 may be configured to receive charge only when the inductive charger 512 is deployed from the vehicle 100. In other embodiments, the inductive charger 512 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 6:
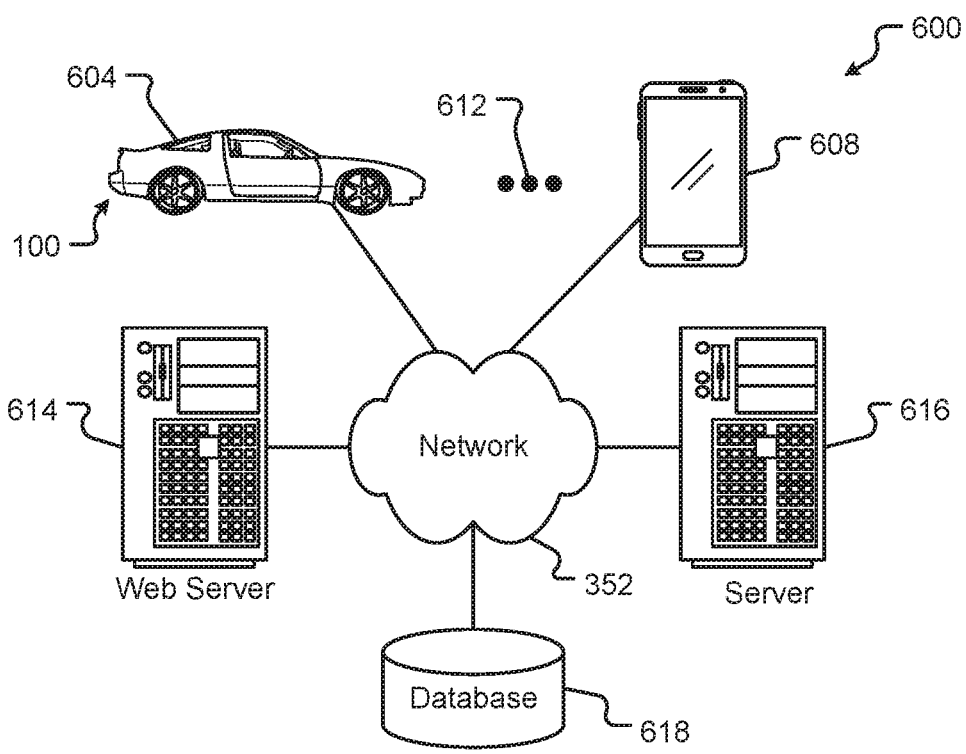
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents or information. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java® servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
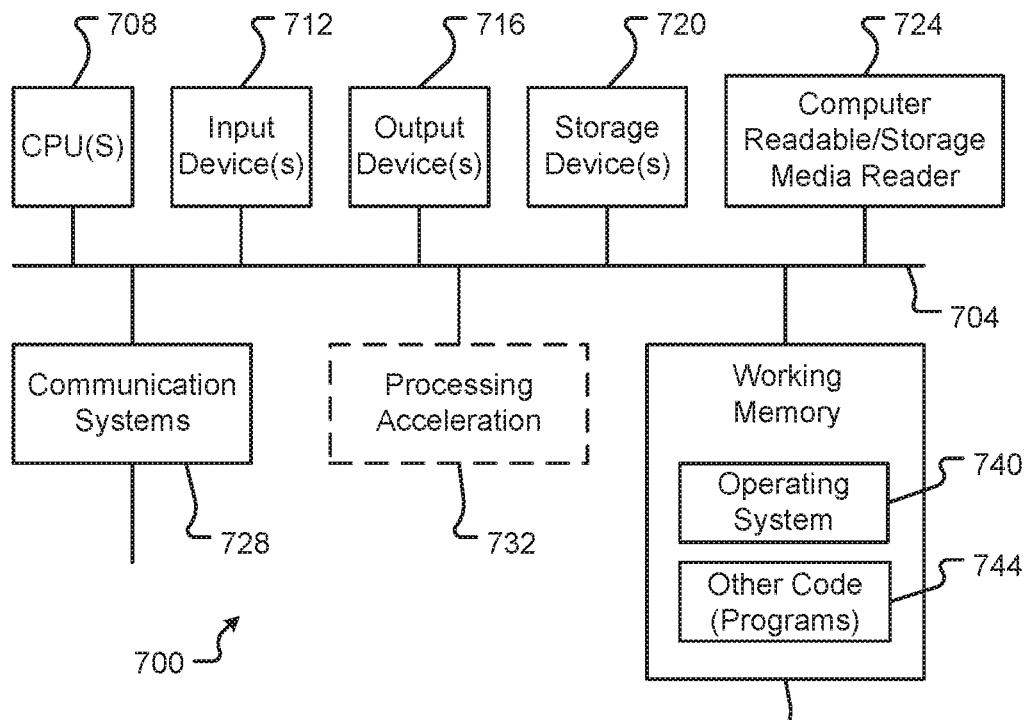
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random-access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Many vehicle applications such as the powertrain are required to be fail operation with the highest Automotive Safety Integrity Level (ASIL) level, i.e., ASIL D. This can be achieved with system redundancies. However, having a redundant system, even with lower ASIL level components, still significantly increases the cost of the systems. Redundant components also significantly increase the weight which can also negatively impact the efficiency or range of the vehicle. Accordingly, embodiments of the present invention are directed to providing a fail operation powertrain of an electric vehicle without requiring redundant hardware.

More specifically, embodiments of the present disclosure are directed to using ASIL decomposition and a functional deployment strategy to redundantly distribute functionality across existing controllers. Accordingly, each of a plurality of non-redundant controllers of the vehicle can execute a plurality of functions. The controllers can comprise a vehicle controller and a controller for each of a plurality of different powertrain systems. The plurality of functions can comprise one or more functions for each of the plurality of powertrain systems and each of the functions can execute on multiple controllers. When a failure of one controller occurs, the functions executing on the failed controller can be transitioned to other controllers based on prior execution of those functions by the other controllers.

As introduced above, a powertrain of a vehicle 100 can include a number of batteries and/or battery packs, e.g., 400V/48V, 400V/12V, and Low Voltage (LV) batteries. The vehicle 100 and vehicle powertrain can also include a vehicle controller 348, a Battery Management System (BMS), inverters, e.g., for front and rear axles, and motors, e.g., four motors with one for each wheel. By using ASIL decomposition techniques and a functional deployment strategy as described below, an electrified powertrain can be made safer and can achieve an ASIL D level with fewer controllers.

Figure 8:
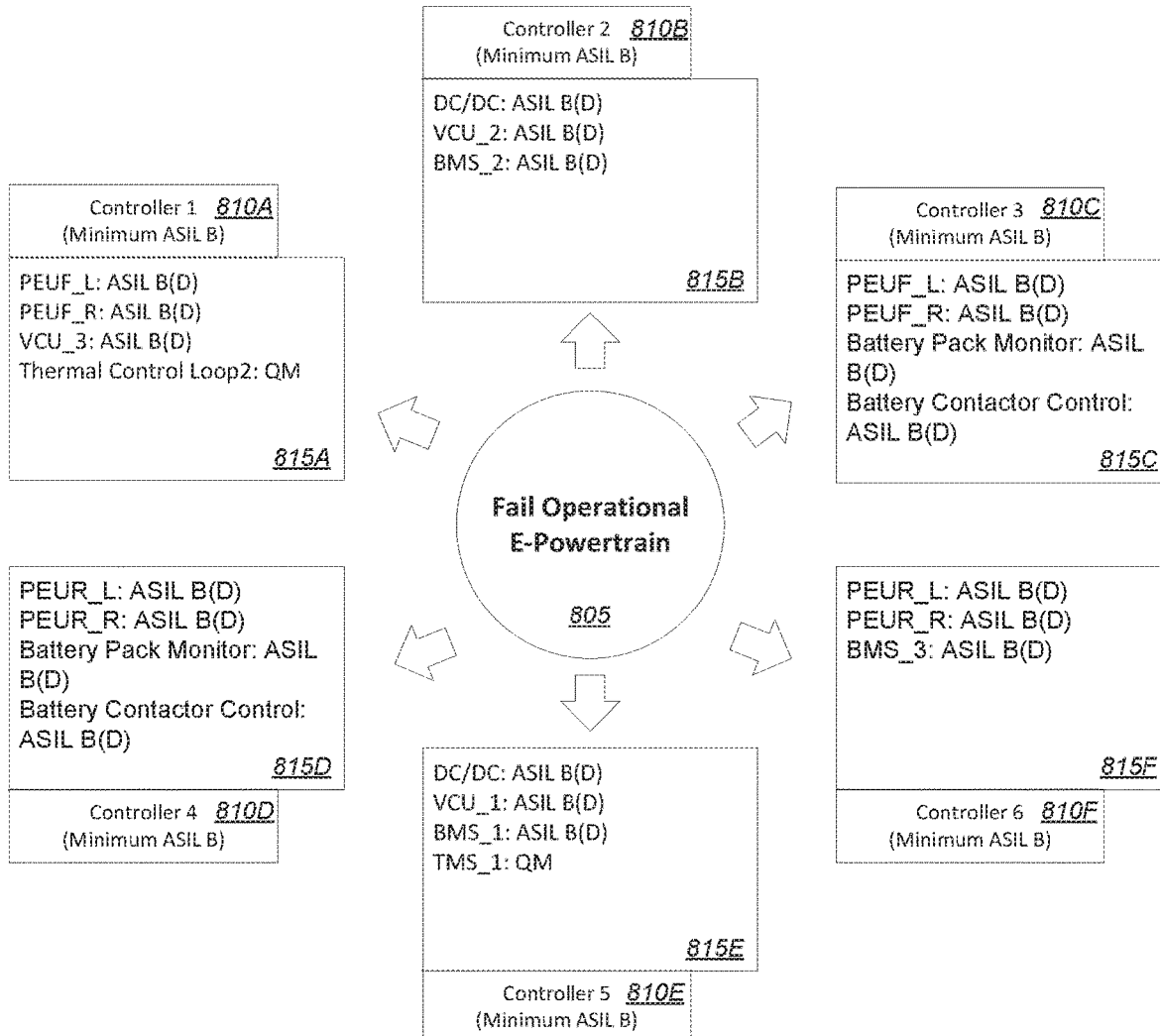
FIG. 8 is a block diagram illustrating components of a vehicle powertrain with function decomposition and redundancy according to one embodiment of the present disclosure.

FIG. 8 is a block diagram illustrating components of a vehicle powertrain with function decomposition and redundancy according to one embodiment of the present disclosure. As illustrated in this example, a power train 805 can comprise plurality of controllers 810A-810F. These controllers 810A-810F can comprise, for example, a vehicle control unit, one or more BMSs for monitoring battery packs and actuating battery contactors, one or more inverter controllers and/or drive motor controllers, one or more battery controllers, and one or more Thermal Management Systems (TMSs). As noted, these controllers can be implemented with a ASIL level below the maximum, e.g., as low as an ASIL B level as illustrated here.

A plurality of functions 815A-815F can be decomposed and distributed across the plurality of controllers. Generally speaking, the plurality of functions 815A-815F can comprise vehicle control functions, motor control functions for a plurality of drive motors, thermal control functions, battery monitor functions, and battery contactor control functions. More specifically and as shown here, the functions can include functions of a Power Electronic Unit one a front axle to control a front-left motor (PEUF_L), functions of a Power Electronic Unit one a front axle to control a front-right motor (PEUF_R), functions of a Power Electronic Unit one a rear axle to control a rear-left motor (PEUR_L), functions of a Power Electronic Unit one a rear axle to control a rear-right motor (PEUR_R), functions of a DC controller for 400V/48V/12V power supplies (DC/DC), functions of a vehicle control unit (VCU), functions of a Battery Management System (BMS), functions of a Thermal Management System (TMS), other thermal control loop functions, battery contactor control functions, etc. Based on this decomposition and distribution, a high ASIL level, e.g., ASIL B(D) can be maintained for these functions. The following table illustrates additional details of the decomposition and distribution as illustrated in FIG. 8.

| System Name | Required ASIL | Fail Operational (Yes/No) | Assigned Controller (Minimum ASIL B) | ASIL Decomposition |
|---|---|---|---|---|
| VCU | D | Yes | Controller 1 | B(D) |
| | | | Controller 2 | B(D) |
| | | | Controller 5 | B(D) |
| BMS (Battery Pack Monitor/ Contactor Actuators) | D | Yes | Controller 2 | B(D) |
| | | | Controller 3 | B(D) |
| | | | Controller 4 | B(D) |
| | | | Controller 5 | B(D) |
| | | | Controller 6 | B(D) |
| Propulsion System (Two Inverters/Four Motors) | D | Yes | Controller 1 | B(D) |
| | | | Controller 3 | B(D) |
| | | | Controller 4 | B(D) |
| | | | Controller 6 | B(D) |
| DC/DC (400 V/ 48 V/12 V) (LV battery) | D | Yes | Controller 2 | B(D) |
| | | | Controller 5 | B(D) |
| TMS (Two separate thermal loops) | QM | Yes | Controller 1 | N/A |
| | | | Controller 5 | N/A |

Figure 9:
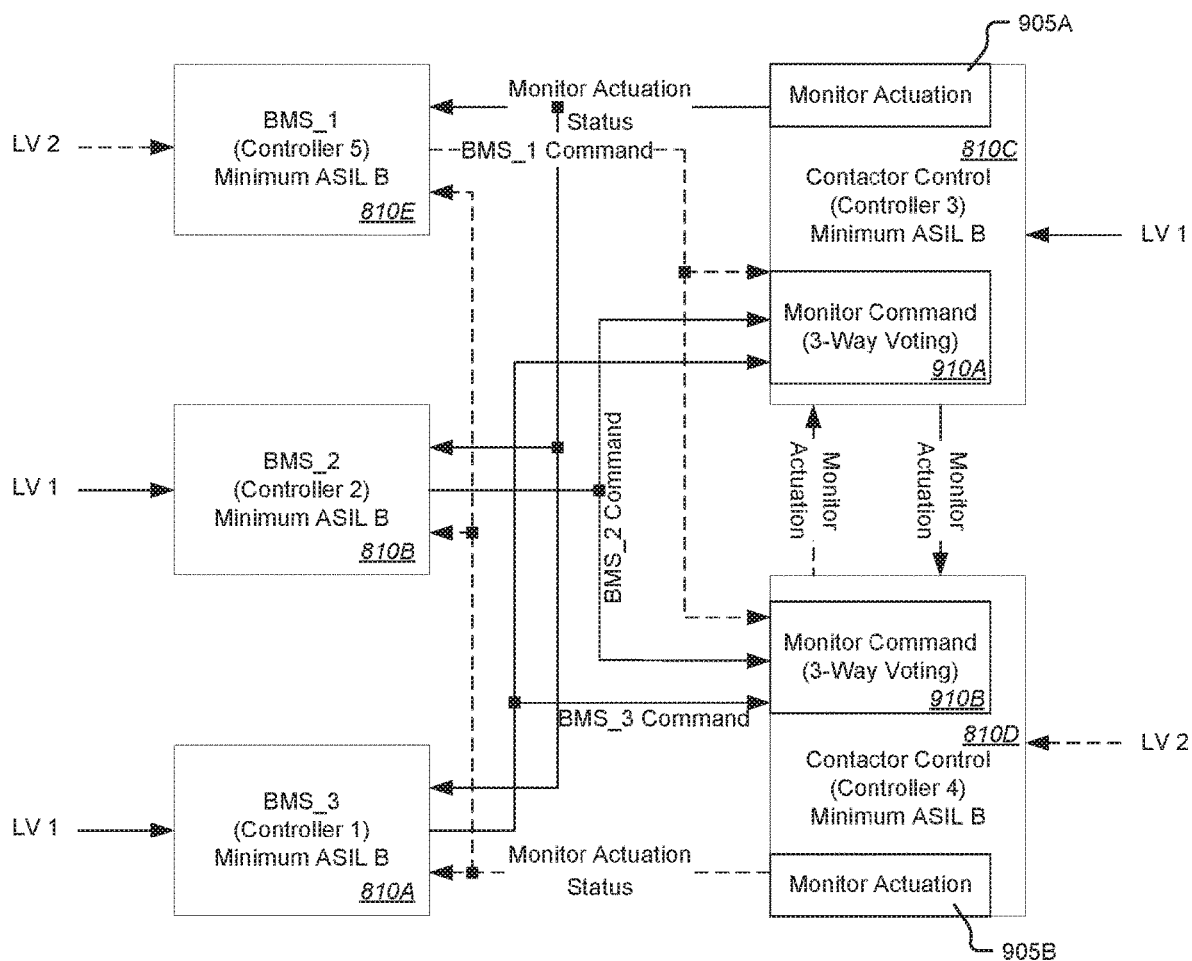
FIG. 9 is a block diagram illustrating a fail operational architecture of a vehicle powertrain according to one embodiment of the present disclosure.

FIG. 9 is a block diagram illustrating a fail operational architecture of a vehicle powertrain according to one embodiment of the present disclosure. More specifically, this example illustrates a plurality of controllers 810A-810E as described above. Here, three controllers comprise BMS controllers 810A, 810B, and 810E for three different battery systems while two controllers comprise battery contactor controllers 810C and 810D for two different sets of battery contactors. That is, the controllers 810A-810E are for separate systems rather than being redundant. Each controller 810A-810E can be provided a low voltage power source (LV1 and LV2).

As illustrated here, the contactor controllers 810C and 810D can execute a number of different distributed and redundant functions such as a monitor actuation function 905A and 905B which can monitor actuation of the battery contactors and a monitor command function 910A and 910B monitoring the issuance and handling of BMS commands. It should be noted that while only two functions are shown here for the sake of clarity and simplicity, any number of functions can be decomposed and distributed across the controllers as described above. Similarly, any number of additional or different controllers may be implemented without departing from the scope of the present disclosure.

In operation, the controllers 810A-810E can execute the functions distributed therein and exchange any number of control signals including, but not limited to, signals to monitor contactor actuation, monitor contactor status, issue and respond to BMS commands, etc. For example, the function 905A and 905B to monitor actuation of the contactors can exchange signals with the other controllers to monitor operation of the contactors and determine a current status of the contactors. Similarly, the function 910A and 910B to monitor commands can monitor the issuance and handling of BMS commands exchanged between controllers.

Based on this monitoring, the functions can detect when a failure of one of the controllers 810A-810E occurs. For example, the function 910A and 910B can detect which of the controllers 810A, 810B and 810E has issued an incorrect command via three-way voting, e.g., 810E is voted out by functions 910A or 910B. In response to detecting the failure of a controller 810E, the functions executing on the failed controller 810E can be transitioned to one or more other controllers, e.g., 810A, 810B, based on prior execution of the functions on the other controllers 810A, 810B. After three-way voting, the BMS command is available for controller 810C and 810D to execute. In the meantime, functions 905A and 905B can act as a two-way monitoring to ensure the BMS command is performed correctly by controller 810C or 810D. In case the BMS command is not executed correctly by, e.g., controller 810C, this can be detected by a function 905B via actuation feedback, and the BMS command be further executed by the function 905B.

Figure 10:
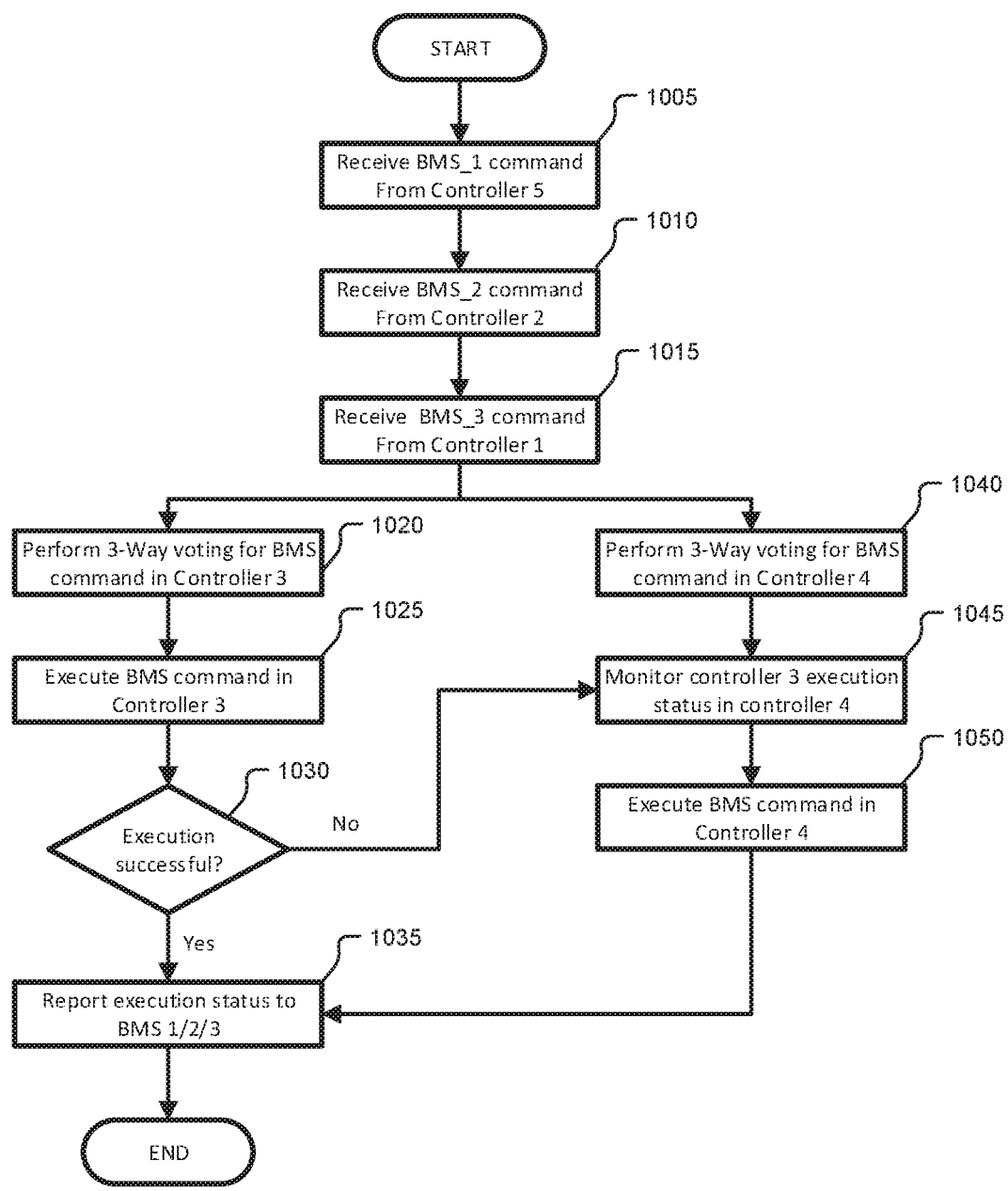
FIG. 10 is a flowchart illustrating a process for providing fail operational control of vehicle components according to one embodiment of the present disclosure.

FIG. 10 is a flowchart illustrating a process for providing fail operational control of vehicle components according to one embodiment of the present disclosure. As illustrated in this example, the process can begin with a controller, such as controller 810C or 810D, receiving 1005 a command from a first controller 810E of the plurality of controllers, receiving 1010 a second command from a second controller 810B of the plurality of controllers, and receiving 1015 a third command from a third controller 810A of the plurality of controllers. Based on these commands or the handling of these commands, a failure of one of the controllers, e.g., controller 810E, can be detected either by controller's 810E built-in, internal monitor, or by three-way voting by both controllers 810C and 810D for commands from controllers 810A, 810B and 810E. The functions executing on the failed controller 810E can be transitioned to one or more other controllers, e.g., 810A, 810B. From this point on, the powertrain is in fail operational and controllers 810C and 810D take command from either controller 810A or 810B based on the predefined fail operational strategy.

Detection of controller 810E failure can comprise performing 1020 and 1040 a three-way voting process on one or more of the controllers 810C and 810D. Based on results of this voting, one or more of the received commands can be executed 1025 on at least one of the controllers, e.g., controller 810C, and monitored 1045 by another controller, e.g., 810D. In response to determining 1030 execution 1025 by one of the controllers 810C has been successful, the execution status can be reported 1035 to the relevant other controllers, e.g., 810A and 810B. In response to determining 1030 execution 1025 by one of the controllers 810C has not been successful, the command can be executed 1050 on another controller, e.g., 810D and the execution status can be reported 1035 to the relevant other controllers, e.g., 810A and 810B.

Stated another way, providing a fail operational powertrain in an electric vehicle can comprise executing, by each of a plurality of controllers 810A-810E of the vehicle, a plurality of functions 905A, 905B, 910A, and 910B. The plurality of controllers 810A-810E can comprise a vehicle controller and a controller for each of a plurality of different powertrain systems. The plurality of functions 905A, 905B, 910A, and 910B can comprise one or more functions for each of the plurality of powertrain systems. None of the controllers for the plurality of different powertrain systems need to be redundant, and each of the plurality of functions 905A, 905B, 910A, and 910B can execute on a plurality of the plurality of controllers 810A-810E.

For example, the plurality of powertrain systems can comprise one or more battery management systems, one or more inverter controllers, and one or more thermal management systems. The plurality of functions 905A, 905B, 910A, and 910B can comprise, for example, vehicle control functions, motor control functions for a plurality of drive motors, thermal control functions, battery monitor functions, and battery contactor control functions. According to one embodiment, the fail operation powertrain can be Automotive Safety Integrity Level (ASIL) D compliant and, based on the decomposition and distribution of the various functions as described above, each controller of the plurality of controllers 810A-810E can be ASIL compliant at a level below ASIL D.

A failure of a first controller, e.g., 810E, of the plurality of controllers 810A-810E can be detected by at least one of the plurality of controllers, e.g., 810C and/or 810D. In response to detecting the failure of the first controller 810E of the plurality of controllers 810A-810E, the plurality of functions executing on the first controller 810E can be transitioned by the plurality of controllers 810A-810E to one or more second controllers, e.g., 810A, 810B, 810C, or 810D of the plurality of controllers 810A-810E based on prior execution of the plurality of functions executing on the first controller 810A by the one or more second controllers 810A, 810B, 810C, or 810D. Transitioning the plurality of functions executing on the first controller 810E to the one or more second controllers 810A, 810B, 810C, or 810D of the plurality of controllers can further comprise performing a two-way comparison between the plurality of controllers. In other cases, transitioning the plurality of functions executing on the first controller 810E to the one or more second controllers 810A, 810B, 810C, or 810D of the plurality of controllers can further comprise performing a three-way voting process between the plurality of controllers.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method for providing a fail operational powertrain in an electric vehicle, the method comprising: executing, by each of a plurality of controllers of the vehicle, a plurality of functions, the plurality of controllers comprising a vehicle controller and a controller for each of a plurality of different powertrain systems, the plurality of functions comprising one or more functions for each of the plurality of powertrain systems, wherein none of the controllers for the plurality of different powertrain systems are redundant, and wherein each of the plurality of functions executes on a plurality of the plurality of controllers; detecting, by at least one of the plurality of controllers, a failure of a first controller of the plurality of controllers; and in response to detecting the failure of the first controller of the plurality of controllers, transitioning, by the plurality of controllers, the plurality of functions executing on the first controller to one or more second controllers of the plurality of controllers based on prior execution of the plurality of functions executing on the first controller by the one or more second controllers.

Aspects of the above method include wherein the fail operation powertrain is Automotive Safety Integrity Level (ASIL) D compliant.

Aspects of the above method include wherein each controller of the plurality of controllers is ASIL compliant at a level below ASIL D.

Aspects of the above method include wherein transitioning the plurality of functions executing on the first controller to the one or more second controllers of the plurality of controllers further comprises performing a two-way comparison between the plurality of controllers.

Aspects of the above method include wherein transitioning the plurality of functions executing on the first controller to the one or more second controllers of the plurality of controllers further comprises performing a three-way voting process between the plurality of controllers.

Aspects of the above method include wherein the plurality of powertrain systems comprise one or more battery management systems, one or more inverter controllers, and one or more thermal management systems.

Aspects of the above method include wherein the plurality of functions comprise vehicle control functions, motor control functions for a plurality of drive motors, thermal control functions, battery monitor functions, and battery contactor control functions.

Embodiments include a vehicle, comprising: a plurality of different powertrain systems; and a plurality of controllers comprising a vehicle controller and a controller for each of the plurality of different powertrain systems, wherein none of the controllers for the plurality of different powertrain systems are redundant, and wherein each of the plurality of controllers of the vehicle comprises a processor and a memory coupled with and readable by the processor and stores therein a set of instructions which, when executed by the processor of each controller, causes the processor to: execute a plurality of functions, the plurality of functions comprising one or more functions for each of the plurality of powertrain systems, and wherein each of the plurality of functions executes on a plurality of the plurality of controllers; detect a failure of a first controller of the plurality of controllers; and in response to detecting the failure of the first controller of the plurality of controllers, transition the plurality of functions executing on the first controller to one or more second controllers of the plurality of controllers based on prior execution of the plurality of functions executing on the first controller by the one or more second controllers.

Aspects of the above system include wherein the fail operation powertrain is Automotive Safety Integrity Level (ASIL) D compliant.

Aspects of the above system include wherein each controller of the plurality of controllers is ASIL compliant at a level below ASIL D.

Aspects of the above system include wherein transitioning the plurality of functions executing on the first controller to the one or more second controllers of the plurality of controllers further comprises performing a two-way comparison between the plurality of controllers.

Aspects of the above system include wherein transitioning the plurality of functions executing on the first controller to the one or more second controllers of the plurality of controllers further comprises performing a three-way voting process between the plurality of controllers.

Aspects of the above system include wherein the plurality of powertrain systems comprise one or more battery management systems, one or more inverter controllers, and one or more thermal management systems.

Aspects of the above system include wherein the plurality of functions comprise vehicle control functions, motor control functions for a plurality of drive motors, thermal control functions, battery monitor functions, and battery contactor control functions.

Embodiments include a non-transitory computer-readable medium comprising a set of instructions stored therein which, when executed by a processor, causes the processor to provide a fail operational power train in an electric vehicle by: executing, by each of a plurality of controllers of the vehicle, a plurality of functions, the plurality of controllers comprising a vehicle controller and a controller for each of a plurality of different powertrain systems, the plurality of functions comprising one or more functions for each of the plurality of powertrain systems, wherein none of the controllers for the plurality of different powertrain systems are redundant, and wherein each of the plurality of functions executes on a plurality of the plurality of controllers; detecting, by at least one of the plurality of controllers, a failure of a first controller of the plurality of controllers; and in response to detecting the failure of the first controller of the plurality of controllers, transitioning the plurality of functions executing on the first controller to one or more second controllers of the plurality of controllers based on prior execution of the plurality of functions executing on the first controller by the one or more second controllers.

Aspects of the above non-transitory computer-readable medium include wherein the fail operation powertrain is Automotive Safety Integrity Level (ASIL) D compliant.

Aspects of the above non-transitory computer-readable medium include wherein each controller of the plurality of controllers is ASIL compliant at a level below ASIL D.

Aspects of the above non-transitory computer-readable medium include wherein transitioning the plurality of functions executing on the first controller to the one or more second controllers of the plurality of controllers further comprises performing a two-way comparison between the plurality of controllers.

Aspects of the above non-transitory computer-readable medium include wherein transitioning the plurality of functions executing on the first controller to the one or more second controllers of the plurality of controllers further comprises performing a three-way voting process between the plurality of controllers.

Aspects of the above non-transitory computer-readable medium include wherein the plurality of powertrain systems comprise one or more battery management systems, one or more inverter controllers, and one or more thermal management systems and wherein the plurality of functions comprise vehicle control functions, motor control functions for a plurality of drive motors, thermal control functions, battery monitor functions, and battery contactor control functions.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method for providing a fail operational powertrain in an electric vehicle, the method comprising:
   executing, by each of a plurality of controllers of the vehicle, a plurality of functions, the plurality of controllers comprising a vehicle controller and a controller for each of a plurality of different powertrain systems, the plurality of functions comprising one or more functions for each of the plurality of powertrain systems, wherein none of the controllers for the plurality of different powertrain systems are redundant of each other or have redundant components, and wherein each of the plurality of functions executes on a plurality of the plurality of controllers;
   detecting, by at least one of the plurality of controllers, a failure of a first controller of the plurality of controllers; and
   in response to detecting the failure of the first controller of the plurality of controllers, transitioning, by the plurality of controllers, the plurality of functions executing on the first controller to one or more second controllers of the plurality of controllers based on prior execution of the plurality of functions executing on the first controller by the one or more second controllers.

2. The method of claim 1, wherein transitioning the plurality of functions executing on the first controller to the one or more second controllers of the plurality of controllers further comprises performing a two-way comparison between the plurality of controllers.

3. The method of claim 1, wherein, when the one or more second controllers comprises at least two controllers, transitioning the plurality of functions executing on the first controller to the at least two controllers of the plurality of controllers further comprises performing a three-way voting process between the plurality of controllers.

4. The method of claim 1, wherein the fail operation powertrain is Automotive Safety Integrity Level (ASIL) D compliant.

5. The method of claim 4, wherein each controller of the plurality of controllers is ASIL compliant at a level below ASIL D.

6. The method of claim 1, wherein the plurality of powertrain systems comprise one or more battery management systems, one or more inverter controllers, and one or more thermal management systems.

7. The method of claim 6, wherein the plurality of functions comprise vehicle control functions, motor control functions for a plurality of drive motors, thermal control functions, battery monitor functions, and battery contactor control functions.

8. A vehicle, comprising:
   a plurality of different powertrain systems; and
   a plurality of controllers comprising a vehicle controller and a controller for each of the plurality of different powertrain systems, wherein none of the controllers for the plurality of different powertrain systems are redundant of each other or have redundant components, and wherein each of the plurality of controllers of the vehicle comprises a processor and a memory coupled with and readable by the processor and stores therein a set of instructions which, when executed by the processor of each controller, causes the processor to:
   execute a plurality of functions, the plurality of functions comprising one or more functions for each of the plurality of powertrain systems, and wherein each of the plurality of functions executes on a plurality of the plurality of controllers;
   detect a failure of a first controller of the plurality of controllers; and
   in response to detecting the failure of the first controller of the plurality of controllers, transition the plurality of functions executing on the first controller to one or more second controllers of the plurality of controllers based on prior execution of the plurality of functions executing on the first controller by the one or more second controllers.

9. The vehicle of claim 8, wherein transitioning the plurality of functions executing on the first controller to the one or more second controllers of the plurality of controllers further comprises performing a two-way comparison between the plurality of controllers.

10. The vehicle of claim 8, wherein, when the one or more second controllers comprises at least two controllers, transitioning the plurality of functions executing on the first controller to the at least two controllers of the plurality of controllers further comprises performing a three-way voting process between the plurality of controllers.

11. The vehicle of claim 8, wherein each of the plurality of different powertrain systems is Automotive Safety Integrity Level (ASIL) D compliant.

12. The vehicle of claim 11, wherein each controller of the plurality of controllers is ASIL compliant at a level below ASIL D.

13. The vehicle of claim 8, wherein the plurality of powertrain systems comprise one or more battery management systems, one or more inverter controllers, and one or more thermal management systems.

14. The vehicle of claim 13, wherein the plurality of functions comprise vehicle control functions, motor control functions for a plurality of drive motors, thermal control functions, battery monitor functions, and battery contactor control functions.

15. A non-transitory computer-readable medium comprising a set of instructions stored therein which, when executed by a processor, causes the processor to provide a fail operational power train in an electric vehicle by:

executing, by each of a plurality of controllers of the vehicle, a plurality of functions, the plurality of controllers comprising a vehicle controller and a controller for each of a plurality of different powertrain systems, the plurality of functions comprising one or more functions for each of the plurality of powertrain systems, wherein none of the controllers for the plurality of different powertrain systems are redundant of each other or have redundant components, and wherein each of the plurality of functions executes on a plurality of the plurality of controllers;

detecting, by at least one of the plurality of controllers, a failure of a first controller of the plurality of controllers; and in response to detecting the failure of the first controller of the plurality of controllers, transitioning the plurality of functions executing on the first controller to one or more second controllers of the plurality of controllers based on prior execution of the plurality of functions executing on the first controller by the one or more second controllers.

16. The non-transitory computer-readable medium of claim 15, wherein transitioning the plurality of functions executing on the first controller to the one or more second controllers of the plurality of controllers further comprises performing a two-way comparison between the plurality of controllers.

17. The non-transitory computer-readable medium of claim 15, wherein, when the one or more second controllers comprises at least two controllers, transitioning the plurality of functions executing on the first controller to the at least two controllers of the plurality of controllers further comprises performing a three-way voting process between the plurality of controllers.

18. The non-transitory computer-readable medium of claim 15, wherein the plurality of powertrain systems comprise one or more battery management systems, one or more inverter controllers, and one or more thermal management systems and wherein the plurality of functions comprise vehicle control functions, motor control functions for a plurality of drive motors, thermal control functions, battery monitor functions, and battery contactor control functions.

19. The non-transitory computer-readable medium of claim 15, wherein the fail operation powertrain is Automotive Safety Integrity Level (ASIL) D compliant.

20. The non-transitory computer-readable medium of claim 19, wherein each controller of the plurality of controllers is ASIL compliant at a level below ASIL D.

* * * * *

UNITED STATES PATENT AND TRADEMARK OFFICE
CERTIFICATE OF CORRECTION

PATENT NO. : 10,857,889 B2
APPLICATION NO. : 15/725119
DATED : December 8, 2020
INVENTOR(S) : Xiaodong Liu et al.

Page 1 of 1

It is certified that error appears in the above-identified patent and that said Letters Patent is hereby corrected as shown below:

In the Claims

Claim 1, Column 29, Line 50, replace "powertrain" with --different powertrain-- therein.
Claim 6, Column 30, Line 17, replace "powertrain systems" with --different powertrain systems-- therein.
Claim 8, Column 30, Line 39, replace "powertrain systems" with --different powertrain systems-- therein.
Claim 13, Column 31, Line 2, replace "powertrain systems" with --different powertrain systems-- therein.
Claim 15, Column 31, Line 19, replace "powertrain" with --different powertrain-- therein.
Claim 18, Column 32, Line 18, replace "powertrain systems" with --different powertrain systems-- therein.

Signed and Sealed this
Second Day of March, 2021

Drew Hirshfeld
*Performing the Functions and Duties of the
Under Secretary of Commerce for Intellectual Property and
Director of the United States Patent and Trademark Office*